Patented Aug. 17, 1937

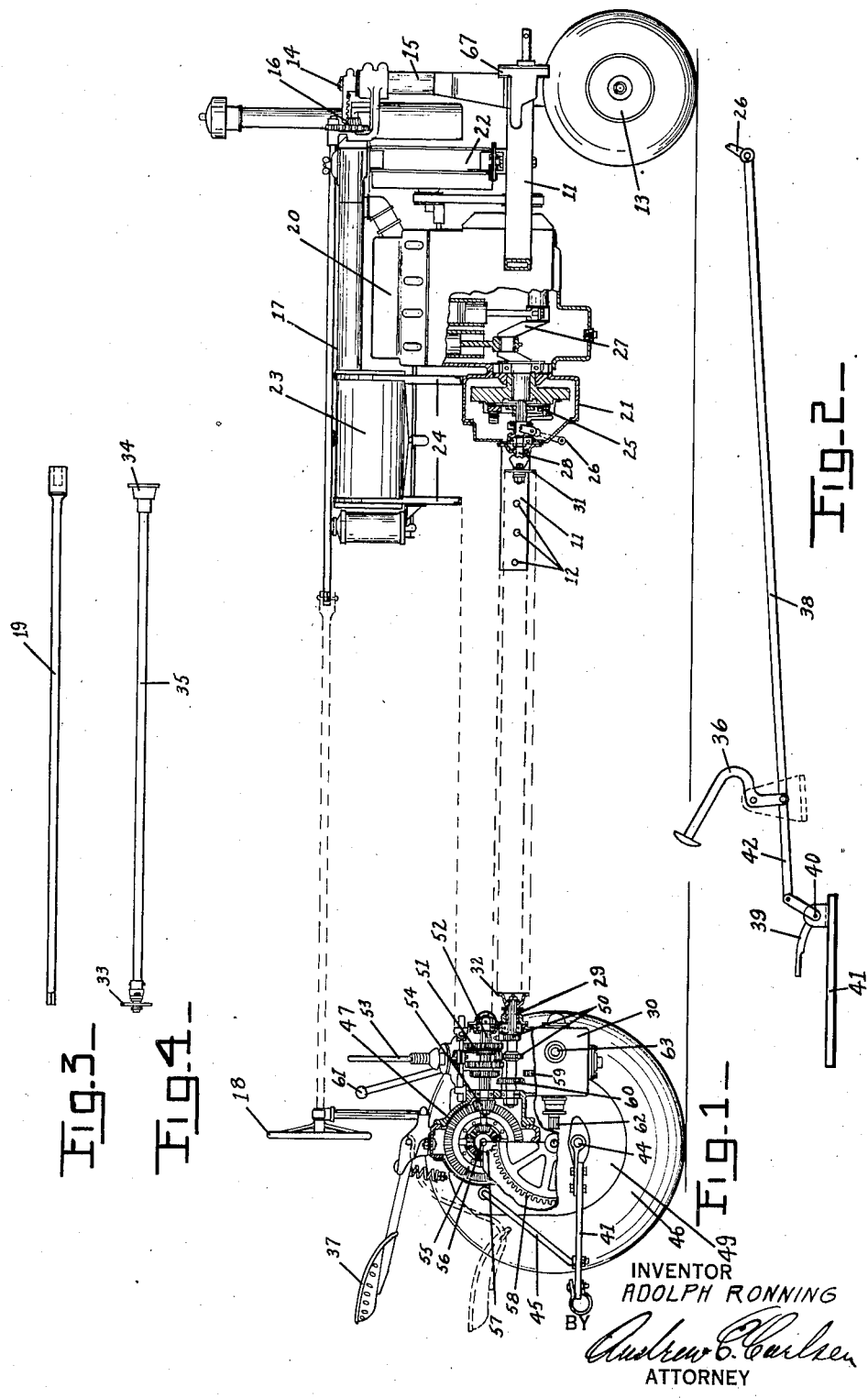

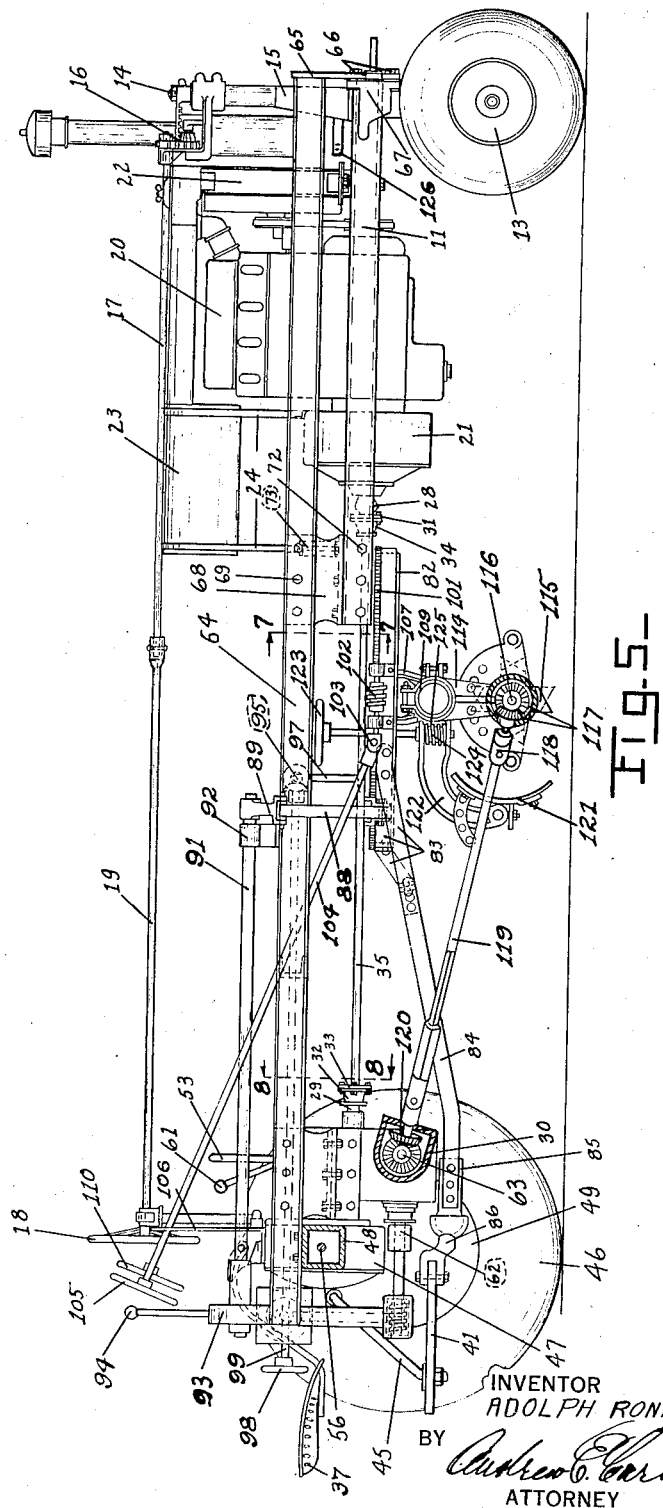

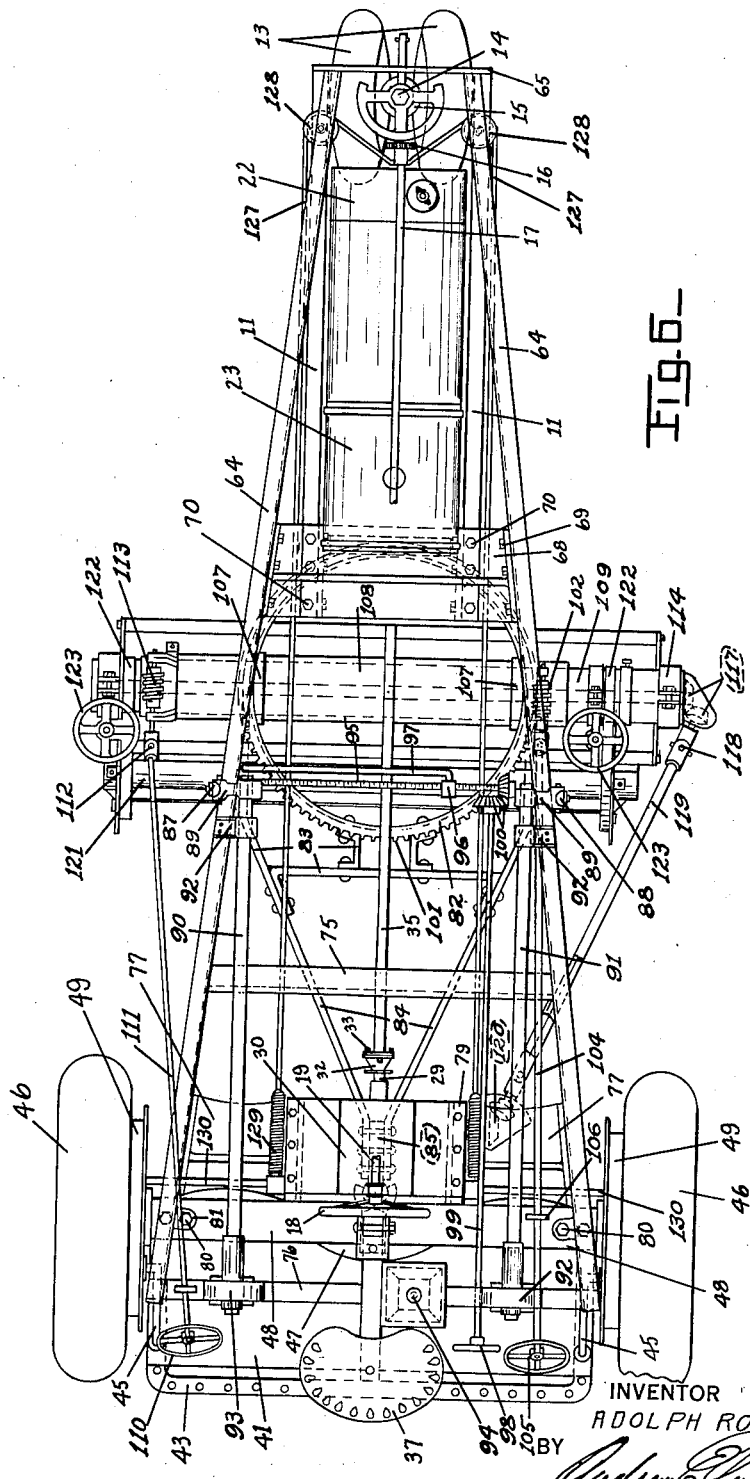

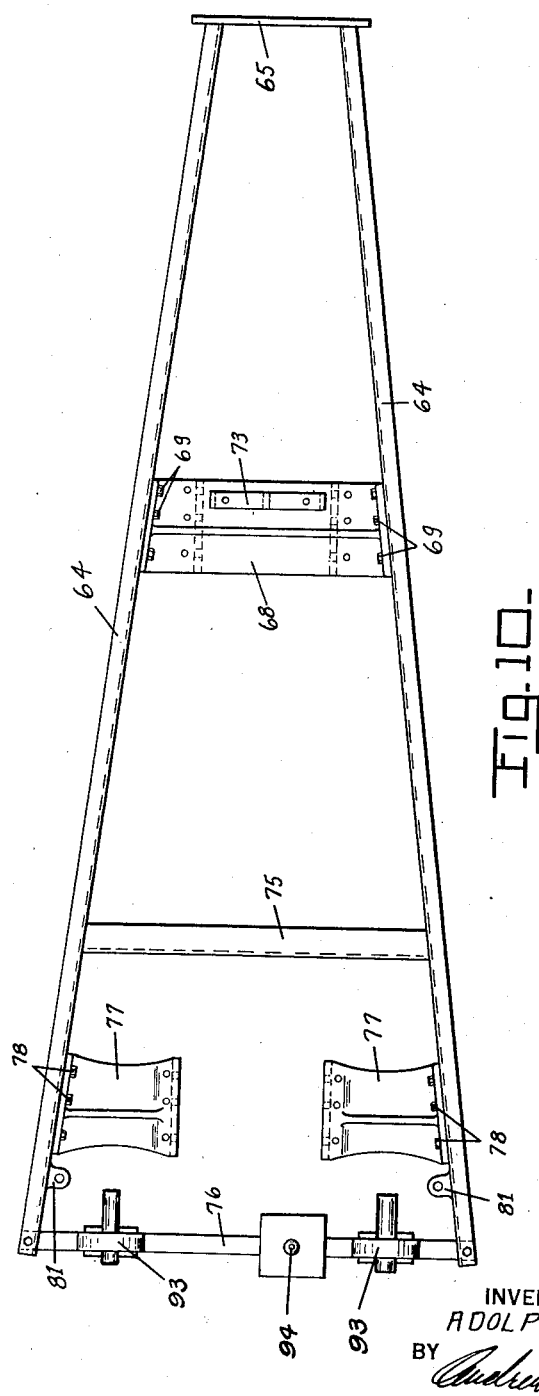

2,090,154

UNITED STATES PATENT OFFICE 2,090,154

POWER GRADER

Adolph Ronning, Minneapolis, Minn.

Application August 12, 1935, Serial No. 35,727

2 Claims. (Cl. 180—1)

This invention relates to combination tractor-implements, particularly of the type generally designated as power graders, and the primary object is to provide a machine which utilizes substantially all of the parts of a conventional or standard form of tractor in association and coordination with supplemental frame and implement units, controls, power take off, etc., to the end that the resultant combination and arrangement will present various features and advantages not disclosed or embodied in powered implements of the prior arts of which I have knowledge. More particularly it is my purpose to construct the combination tractor-implement by first separating the tractor assembly into two longitudinally spaced units, the front unit comprising the power-plant or engine, the front steering and supporting truck, gasoline tank, cooling system, and the clutch unit connecting the engine crank shaft to the power shaft of the transmission and differential mechanisms. The rearwardly spaced tractor unit incorporates the usual rear traction wheels and various parts supported thereby including the speed transmission and differential drive mechanisms, the housings and controls therefor, operators' stations, brake units, steering wheel, and engine controls. The two thus separated tractor units are then rigidly connected by an elongated supplemental frame which not only supports the units in operative positions, but also supports the implement or tool structure in position intermediate the units; while the tractor units are connected by intermediate extensions to transmit power and provide necessary control of the front unit by the operator positioned at the rear.

The arrangement thus produced has a number of important structural and functional advantages of which the following may be mentioned: By placing the engine and directly associated and adjacent tractor elements in advance of the grader blade (or other implement), and the remaining tractor parts rearwardly thereof, I secure a distribution of weight that is particularly desirable in a grader or other machine that is susceptible to sidewise pressure due to the angular resistance set up by the road material accumulating in front of the grader blade which is almost invariably disposed at an angle with respect to the direction of travel. In machines having the tractor engine and associated parts all tied or harnessed into a framework in back of the blade the weight is unevenly distributed to the rear and the lack of sufficient weight in advance of the blade causes the front end of the machine to shift transversely. Merely steering the front wheels, in such instances, is ineffective because there is not enough weight upon them to give them the required gripping contact with the road surface. Machines of this type which are now in general use, are disclosed in Ronning and Ronning United States patents such as Nos. 1,706,256; 1,658,354; and 1,819,624, and in my own patents, Nos. 1,883,404, and 1,883,407; and while those patents disclose various advantages in the then existing prior art the structures thereof are subject to the criticism just mentioned. It might be noted that the converse of this situation is met with in prior art structures such as disclosed in Ronning and Ronning Patent No. 1,883,403, wherein the entire tractor weight is disposed in advance of the grading tool, with a result that there is insufficient weight at the rear to overcome the sidewise pressure caused by earth resistance against the angularly disposed blade.

A further advantage in the present arrangement over the tractor-pushed graders referred to is that by placing the engine in a forward position it does not obstruct the operator's view of the blade, the road surface immediately in front thereof, or the work being done; all extremely vital factors in a successful machine; and this advantage is maintained without in any way interfering with the operator's vision and complete control of the engine, the steering unit, transmission, etc., all of which have controls extending to within reach of the operator stationed on the rearwardly spaced tractor unit. It is of course unnecessary to provide any extension devices for the transmission shift lever or direct brake controls as these are already in proper position to be manipulated in exactly the same manner as in the original unseparated tractor assembly.

Another advantage in arranging the parts as indicated, and with the engine in a forward position, is that the air cleaner, carbureter, and other relatively sensitive devices will be exposed and subject to the destructive action of dust to a much lesser degree than where the engine is disposed rearwardly of the ground or road working implements which always have a decided tendency to raise dust when at work.

Still further and more specific objects will be disclosed in the course of the following specification, reference being had to the accompanying sheets of drawings which illustrate a preferred embodiment of the invention and in which—

Fig. 1 is a side elevation of a tractor, partly in section, with parts broken away or removed, and with the front and rear assemblies separated and moved to the relative positions they occupy in the completed machine, the horizontal, dotted lines merely connecting the points of normal attachment in the completely assembled tractor as such.

Fig. 2 is an elevation of the clutch control attachment preferably employed in the reassembled machine.

Fig. 3 is an elevation of a supplemental steering shaft extension which is secured between the usual steering shaft and rearwardly separated steering hand wheel.

Fig. 4 is an elevation of the supplemental power shaft extension.

Fig. 5 is a side elevation of the entire tractor grader assembly, but with the right rear wheel and certain other parts removed for purpose of illustration.

Fig. 6 is a plan view of the complete machine as shown in Fig. 5.

Fig. 10 is a plan view of the frame structure unit which connects the spaced tractor units and supports the grader assembly or other working implement.

Figure 7:
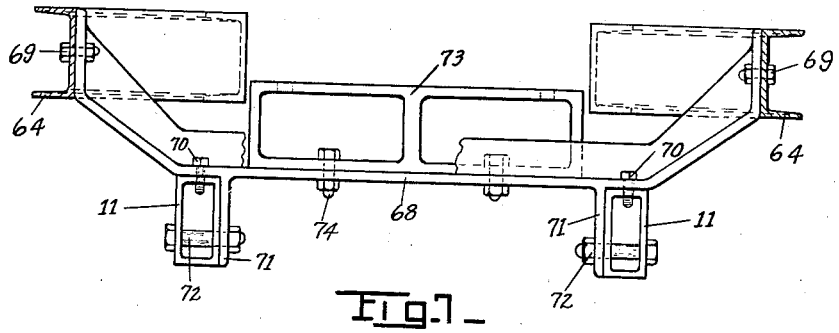
Fig. 7 is an enlarged, detail, transverse section of certain frame structure parts, on the line 7—7 in Fig. 5.
Figure 8:
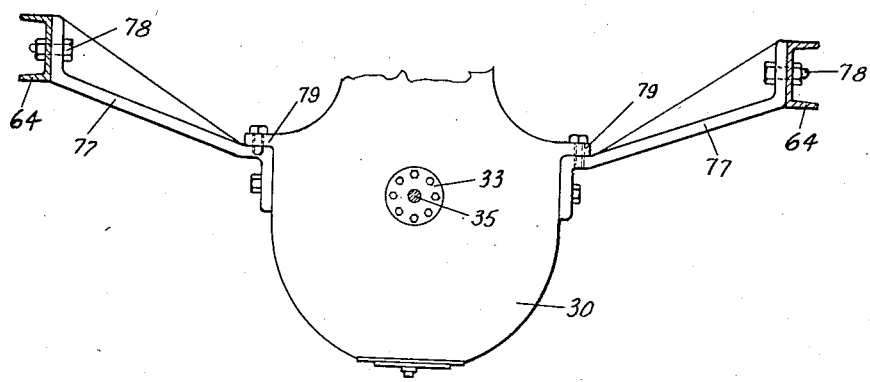
Fig. 8 is an enlarged, detail section on the line 8—8 in Fig. 5.

In constructing a machine embodying the present invention I preferably employ a tractor of the type known as the Farmall, manufactured and sold by the International Harvester Company. This design of tractor is particularly adapted for this machine as it can be very quickly and conveniently separated into two units in the manner here contemplated.

The front unit of the tractor, as shown in Figs. 1, 5, and 6, comprises a pair of laterally disposed, hollow frame beams 11, the front ends of which are supported on a front steering truck, while the rear ends have holes 12 through which bolts extend and by which bolts the beams are rigidly secured to the cast body housing of the rear unit when the two units are normally connected in tractor forming arrangement.

The steering truck comprises a pair of closely spaced wheels 13, preferably provided with pneumatic tires, and these wheels are mounted on a vertical shaft or spindle 14, which rotates in a rigid standard 15, and is provided at its upper end with gear means 16 whereby it may be turned in either direction by a steering shaft 17. This shaft normally engages in the hand wheel 18, mounted on the rear unit, but in the rearranged machine a supplemental or extension shaft 19 is conveniently inserted between members 17 and 18. The ground wheels 13 are so mounted that they converge downwardly (Fig. 6) to resist side slipping, and this is of course particularly advantageous in a grading machine.

The beams 11 support the engine 20, to the crank case of which is joined the clutch housing 21, and the radiator 22 of the engine cooling system is also carried by the beams 11 between the motor 20 and standard 15. The gasoline tank 23 is supported by two brackets 24, the forward one of which is secured on the clutch housing 21. The rear bracket 24, normally anchored on the rear tractor unit, is released therefrom and resecured in a manner subsequently to be set forth.

The clutch 25, within the housing 21, is operated by an exterior lever 26 to connect and disconnect the engine crank shaft 27 with respect to a short drive shaft 28. This drive shaft 28, in the normal tractor arrangement drives a co-axial shaft 29, journaled in the transmission housing 30 of the rear unit, through a universal or flexible joint including a flexible disc 31 on the shaft 28 and a cup or sleeve 32 on the shaft 29, the members 31 and 32 being separably secured by bolts. In the rearranged machine the bolts connecting members 31 and 32 are removed, and such members are then resecured to corresponding disc and cup members 33 and 34 of an intermediate or supplemental power shaft extension 35 which is inserted to operatively connect shafts 28 and 29.

The clutch lever 26, in the normal tractor, is connected by a short rod (not shown) to a foot lever such as 36 (see Fig. 2) pivotally carried by the rear end of the tractor so that it can be operated by the driver when on the seat 37. In the rearranged machine such short rod is removed and substituted by a longer connecting rod 38. To further facilitate operation of the clutch I provide a supplemental or auxiliary lever 39 which is fulcrumed as at 40 to the platform 41 of the rear unit, and this lever 39 is connected to lever 36 and rod 38 by a link 42. The platform 41 is mounted on the draw bar frame 43 and is rigidly secured therewith to side sections of the rear tractor unit assembly by anchoring devices 44 and brace bars 45. When operating a power grader the operator frequently prefers to stand on the platform 41, or to have the seat 37 adjusted to a lower position (Fig. 5), and it is under such circumstances that the auxiliary clutch lever 39 comes into convenient use.

The rear tractor unit is supported on transversely spaced, relatively large traction wheels 46, and includes transmission, differential, drive shaft, and brake mechanisms, all inclosed by rigidly connected housings, which with said mechanisms form a conveniently grouped assembly, as indicated particularly in Figs. 1, 5, and 6. Thus the transmission housing 30 joins with the differential housing 47 which in turn has lateral hollow extensions 48 forming a transverse beam terminating at its ends, and adjacent the wheels 46, in drive gear and brake housings 49.

The power transmitting mechanisms within these housings is of course conventional in design and construction, but may be briefly described as follows: The shaft 29 within the housing 30 has a series of small spur gears 50 which are selectively engaged by spur gears 51 on a shaft 52, the speed selections being effected by manipulation of a hand lever 53. The shaft 52 is provided at its rear end with a bevel pinion 54 which operates through a conventional differential mechanism 55 to rotate shafts 56 which extend through the housing extensions 48 and are provided at their ends with spur pinions 57 which drive large spur gears 58 on the respective traction wheels 46. Thus power is transmitted at selective speeds from the power shaft 29 and differentially to the traction wheels.

A power take-off mechanism is also provided in the lower end of the transmission housing 30, and includes an axially slidable gear 59 adapted to be moved into driving connection with a gear 60 on the drive shaft 29 under the action of a hand lever 61. When this connection is made power is transmitted to a splined take-off shaft 62 which extends rearwardly from the housing 30 for convenient connection with various types of implements, and there is also provided a laterally extending power take-off shaft 63 to which a pulley is ordinarily secured for the purpose of driving various mechanisms by belt connection. Both of these power take-off shafts 62 and 63 are employed in the present machine to transmit power to various implement mechanisms, as will presently be described.

Figure 9:
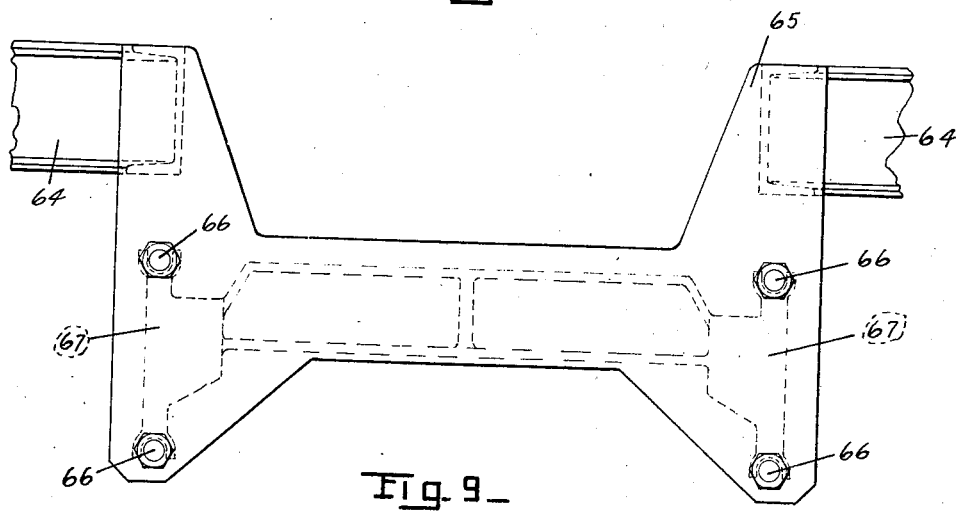
Fig. 9 is an enlarged, detail front end view of the frame and the plate structure by which it is mounted upon the front end of the tractor.

The separated and longitudinally spaced tractor units are harnessed into one machine by employing a comparatively large and sturdy frame structure such as shown in Fig. 10. This frame structure includes a pair of channel iron side beams 64 which converge in a forward direction, and at their front ends are welded or otherwise rigidly secured to a heavy steel plate 65 having the general form and design as indicated in the plan elevation thereof in Fig. 9. This plate is rigidly secured by bolts 66 to suspension brackets 67, which brackets are already on the tractor and are originally intended for the purpose of conveniently securing cultivators and other types of tools to the front end of the tractor.

At a point rearward of the power plant the beams 64 are rigidly connected by a cast cross beam or yoke 68, which is bolted to the beams as at 69 and extends down to a level where it will contact with the upper faces of the rear ends of the beams 11, to which the yoke or cross beam is secured as by bolts 70. The yoke 68 is further provided with depending lugs 71 which are rigidly secured to the inner side faces of the beams 11 as by transverse bolts 72. It will be understood that the holes in the yoke 68 for accommodating the bolts 70 and 72 are so spaced that they will register with the holes 12 in the beams 11, which were previously employed to accommodate the bolts which normally secured the beams 11 to the rear tractor unit. The yoke 68 is further provided with a frame member 73 secured by bolts 74, and this member is so arranged that it will fit under and support the rearmost gas tank bracket 24 which, as previously noted, was necessarily detached from the rear tractor unit. In this case also bolt holes can be so arranged that the same bolts which previously secured the bracket 24 to the transmission housing can be used to resecure the bracket to the frame member 73.

At a position rearwardly of the cross yoke 68 the frame beams 64 may be further rigidly connected by a cross bar 75, the ends of which are welded or otherwise rigidly secured to the beams. At their rear ends the beams 64 are additionally connected by a hollow cross beam 76, bolted or welded in place, and this beam serves a further function of supporting and enclosing various implement controls, as will presently be noted. Intermediate the connecting cross beams 75 and 76 the frame beams 64 are provided with a pair of inwardly and downwardly directed casting brackets 77 which are rigidly secured to the beams as at 78. The inner ends of these brackets are so designed that they will fit against the housing 30, and under lateral flanges 79 thereof, in the places from whence the previously attached tractor beams 11 have been removed, and with bolt holes registering with those of the housing to facilitate attachment. Thus convenient means is provided for securing the rear tractor unit in stable operative position. To further insure stability and relative rigidity of the frame with respect to the rear unit I rest the frame beams 64 directly upon the hollow housing arms 48, and secure them thereto by pairs of bolts 80, one of each pair passing through the lower beam flange, while the other extends down through a lug 81 extending from the frame beam. The bolts 80 do not require special drilling or threading into the housing members 48 as this type of tractor is factory equipped with them for the specific purpose of conveniently attaching certain implements.

The road or ground working devices are attached as a unit to a so-called circle 82 which is mounted for adjustment about a vertical axis in a frame 83. This frame includes rearwardly converging push bars 84 which attach to a casting 85 having a ball resting in a socket bracket 86 attached to the forward edge of the platform 41. Thus the frame 83 and tool carrying circle are pushed by the rear tractor unit, while the ball and socket arrangement permits vertical and angular adjustments of the tools with respect to the road or earth surface being worked.

The implement frame 83 is supported, at its sides, by a pair of depending links 87 and 88, connected at their upper ends to a pair of cranks 89 respectively secured upon the forward ends of a pair of laterally disposed shafts 90 and 91, journaled in bearings 92 on the main frame beams 64. Consequently by rotating the shafts in desired directions the road working implement can be raised, lowered, and angularly adjusted.

The rear ends of the shafts 90 and 91 extend into gear boxes 93 and 92, respectively on the hollow cross beam 76, and are driven through a manually controlled power transmission mechanism which connects with the power take-off shaft 62 of the tractor. This mechanism is fully illustrated and described in my United States Patent No. 1,883,404, issued October 18th, 1932, for Road maintainer, and need not therefore be here set forth in detail. It is sufficient to bear note that by pressing the hand lever 94 forward, rearward, or sidewise, and by various combinations of these movements, the implement frame 83 will be lowered, raised, and/or angularly adjusted, through engine applied power and under sensitive and accurate control of the operator who is in a convenient position to manipulate the lever 94 while observing the operating conditions of the implement and without interfering with his observation and control of other devices.

Provision is also made for shifting the implement and the frame 83 transversely with respect to the machine proper, and this includes a threaded bar 95 which is journaled between the beams 64 and carries a traveller block 96 that is connected to the frame 83 by an inclined transverse connecting rod 97. This rod permits the aforementioned vertical and angular adjustments of the tool frame, and effects the transverse adjustment thereof by the movement of block 96 on the bar 95 when the latter is turned. Rotation of the bar 95, in either direction, is produced by manual power applied through a hand wheel 98, a shaft 99, and bevel pinions 100. The hand wheel 98 is of course also within convenient reach of the operator at the rear of the machine.

To produce angular adjustment of the implement with respect to the direction of travel I provide the rotatable circle member 82 with gear teeth 101 which are engaged by a worm 102 journaled in bearing brackets carried by frame 83. This worm is connected by a universal joint 103 to a shaft 104 extending back to a hand wheel 105, within convenient reach of the operator. Thus by turning the hand wheel 105 the operator can turn the circle 62 and adjust the tool or working implement about a vertical axis. The shaft 104 is slidably supported, near its rear end, in a standard 106 so that it may have freedom for longitudinal movement when the implement frame 83 is vertically or angularly adjusted.

Rigidly secured to and under the circle 82, as by brackets 107, is a transverse hollow beam or tube 108, within which is rotatably mounted a smaller tube 109, and the ends of which inner tube carry the implements proper. The inner tube is manually oscillated or adjusted by a hand wheel 110 through the medium of a shaft 111, universal joint 112, and a worm 113.

Secured by depending arms 114 from the tube 109 is a rotatable scarifier 115 having a shaft 116 driven through bevel pinions 117 and universal joint 118 of a shaft 119, the rear end of which has bevel pinion power connection 120 with the power take-off shaft 63 of the rear tractor unit. The shaft 119 includes telescoped sections whereby position adjustments of the scarifier will not interfere with the transmission of power.

The grader blade 121, which operates behind the scarifier to level off the chopped up surface material, is adjustably carried by arms 122, the rear ends of which pivotally encircle opposite ends of the tube 109. The arms and blade are adjusted with respect to the tube 109 by hand wheels 123 that turn worms 124 meshing with toothed segments 125, the worms 124 being carried by the arms 122 while the segments 125 are secured to the sleeve or tube 109 (see Fig. 5.)

The scarifier and blade mechanisms, as thus referred to, are more specifically described in my Patent No. 1,883,404, to which reference has hereinbefore been made. It will of course be understood that while both scarifier and blade devices are shown, and are particularly adaptable to a machine of this character, they may be used independently of each other, or may be substituted by other types of implement or working units as far as the broader conception of the invention is concerned.

As also explained in my aforementioned Patent No. 1,883,404, it is customary to provide tractors of the type herein disclosed with auxiliary means connecting the steering device with the brakes of the traction wheels in order that the machine may be turned in as short a radius as possible. This, in the present instance, is done by providing the steering spindle 14 with a rearwardly extending arm 126 (see Fig. 5), and to this arm are secured the ends of a pair of cables 127 which pass over pulleys 128 (see Fig. 6) and from thence extend back to springs 129 which connect the rear ends of the cables to the respective brake shafts 130. These shafts extend into the housings 49 which enclose the brake mechanisms for the respective traction wheels 46.

With the rearranged and extended machine, as herein designed, the same mechanism is employed except that extensions must be provided for the cables 127 in order to transmit the swinging movement of the spindle arm 126 to the brake shafts 130. It will now be seen that when the steering truck 13 is angled to a certain degree the arm 126 will exert and pull on one or the other of the cables 127, and consequently the traction wheel 46 on the side to which the machine is being steered will be braked and retarded so that the machine will be steered more abruptly than would otherwise be the case.

In adapting and building in a tractor in a machine such as herein anticipated, the tractor is first separated longitudinally into front and rear units, as indicated particularly in Fig. 1. This is done by releasing the universal drive shaft connection and the steering shaft, and also removing the rearmost gas tank bracket 24 from the transmission housing. The tractor frame bars 11 are then removed from the housing 30, and the two tractor units are then separated and repositioned at spaced, longitudinal points where they must be temporarily supported in any suitable manner until the main frame structure shown in Fig. 10 has been bolted in place. The large frame structure would ordinarily carry most of the implement mechanisms on it before being attached to the tractor units. However, under some circumstances the frame may be first attached, whereupon the working units or implement mechanisms will be secured in place. The latter procedure could probably be followed to advantage, particularly in a factory where the entire machine is built up and permanently united into one single assembly. In any event, after the main frame structure has been rigidly secured in place the extension devices such as the drive shaft member 35, the steering shaft extension 19, and the clutch operating rod 38, are then secured in place. It may also be explained that in order to provide full control for the engine devices from the rear end of the machine, it may be necessary to provide additional extension devices such as rods, wires, etc., for controlling the carburetor, ignition, and starter levers, but it was believed unnecessary to illustrate such devices in detail.

When the machine is used as a combination tractor propelled road working machine such as illustrated in Figs. 5 and 6, the operator either sits in the seat 37 or stands on the platform 41, and when in this position it will be seen that he not only has all of the tractor and implement controls within convenient reach, but that the various parts of the entire machine are so located that they will function to the very best advantage. Thus the transmission and differential mechanisms are retained in their original arrangement adjacent the rear wheels, while the power unit or engine 20 and associated parts are in a position sufficiently forward of the operator so that he will not only be removed from the heat and vibration of the motor, but will also have these parts sufficiently moved forwardly so that he will have an unobstructed view of the working implements and will also be able to observe the road condition immediately in front of the implements.

As previously noted, one of the further outstanding advantages in this machine, particularly when used for road grading purposes, is that there is a proper distribution of weight both forwardly and rearwardly with respect to the blade so that there will be a maximum resistance against the tendency of the dirt to move the blade sidewise when operating in an angular position with respect to the direction of travel.

It may also again be noted that by placing the engine in advance of the road working implements there is a further decided advantage by virtue of the fact that there will be a far lesser tendency for dust kicked up by the scarifier and blade to get into the carburetor, ignition devices, and other relatively delicate parts of the motor unit.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination with separated front and rear tractor units, the front unit including a power plant and laterally disposed tractor frame beams supporting the same, the rear unit including speed selective transmission and differential assembly detached from said frame beams and spaced rearwardly therefrom, of a power connection interposed between the power plant and said assembly, a supplemental frame connecting the two tractor units and having a cross member attached to said tractor frame beams at the normal point of attachment thereto before separation by said transmission and differential assembly to support the power plant and tractor frame beams in operative positions.

2. The combination with separated front and rear tractor units, the front unit including a power plant and laterally disposed tractor frame beams supporting the same, the rear unit including speed selective transmission and differential assembly detached from said frame beams and spaced rearwardly therefrom, of a power connection interposed between the power plant and said assembly, a supplemental frame connecting the two tractor units and rigidly secured at forward points to said tractor frame beams, the rear end of said supplemental frame having inwardly extending bracket members rigidly secured to the said assembly at points from which the tractor frame beams have been removed.

ADOLPH RONNING.